No. 718,252. PATENTED JAN. 13, 1903.
H. J. HJORTH.
SCREW CUTTING DIE.
APPLICATION FILED JAN. 8, 1902.
NO MODEL.
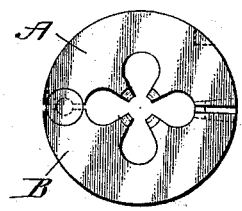
Fig.1.
 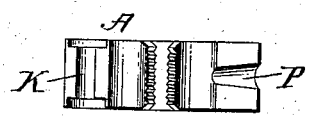 
Fig.3. Fig.2. Fig.4.
WITNESSES: INVENTOR:

UNITED STATES PATENT OFFICE.

HENRICK JULIUS HJORTH, OF CAMBRIDGE, MASSACHUSETTS.

SCREW-CUTTING DIE.

SPECIFICATION forming part of Letters Patent No. 718,252, dated January 13, 1903.

Application filed January 8, 1902. Serial No. 88,908. (No model.)

*To all whom it may concern:*

Be it known that I, HENRICK JULIUS HJORTH, of Cambridge, in the county of Middlesex and State of Massachusetts, have invented a new and useful Improvement in Screw-Cutting Dies, of which the following, taken in connection with the accompanying drawings, is a specification.

My invention relates to the construction of screw-cutting dies of that class in which the die proper is made distinct from the die-plate and is readily connected to and disconnected from it.

The object is to so construct the die that the same may be expanded to change the size of the screw that is to be cut without danger of breaking and also admit of dividing it into two parts when it is desired to sharpen or otherwise repair it. This object I attain by the construction shown in the accompanying drawings, in which—

Figure 1 is a plan showing one of my dies. Fig. 2 is a vertical section of the same. Fig. 3 shows the hinge-pin in elevation. Fig. 4 shows an expanding-pin.

In the drawings, Fig. 1 represents a die made in two parts A and B. The two parts are held together by a hinge-pin H, having flanges F F' at each end, as shown in Fig. 3. This hinge-pin is so made that it fits with a strong frictional cling to the parts A and B, so that when the parts are put together with the pin H in the socket K they will be securely held together and accurately maintained in their true relative positions.

A coned adjusting-pin P is adapted to engage with the socket P' and serves to adjust the parts A and B and to hold them against the pressure of the die-plate in the ordinary manner.

When it is desired to sharpen or otherwise repair the die, it may be taken out of its die-plate and the two parts A and B pulled apart and repaired and then crowded together again.

I claim—

A screw-cutting die, consisting of two semicircular parts, each part having socket-recesses countersunk in its surfaces, and a semicylindrical recess joining the said countersunk recesses; and a hinge-pin having flanges at each end, said pin and its flanges being adapted to fit the recesses and frictionally hold the said semicircular parts together, substantially as and for the purpose set forth.

In testimony whereof I have signed my name to this specification, in the presence of two subscribing witnesses, on this 4th day of January, A. D. 1902.

HENRICK JULIUS HJORTH.

Witnesses:
 FRANK G. PARKER,
 JOHN BUCKLER.